(12) United States Patent
Makoto

(10) Patent No.: US 7,185,051 B2
(45) Date of Patent: Feb. 27, 2007

(54) INFORMATION DEVICE MANAGER, INFORMATION DEVICE MANAGEMENT METHOD, AND COMPUTER-READABLE RECORDING MEDIUM FOR RECORDING INFORMATION DEVICE MANAGEMENT PROGRAM

(75) Inventor: Sakka Makoto, Osaka (JP)

(73) Assignee: Minolta Co., Ltd., Osaka (JP)

( * ) Notice: Subject to any disclaimer, the term of this patent is extended or adjusted under 35 U.S.C. 154(b) by 778 days.

(21) Appl. No.: 09/957,071

(22) Filed: Sep. 21, 2001

(65) Prior Publication Data

US 2002/0078234 A1  Jun. 20, 2002

(30) Foreign Application Priority Data

Sep. 22, 2000  (JP) .............................. 2000-288741

(51) Int. Cl.
*G06F 15/16* (2006.01)

(52) U.S. Cl. ........................ 709/203; 709/226

(58) Field of Classification Search ...................... None
See application file for complete search history.

(56) References Cited

U.S. PATENT DOCUMENTS

| | | | |
|---|---|---|---|
| 5,590,245 A * | 12/1996 | Leamy et al. ............... 345/418 |
| 5,880,447 A * | 3/1999 | Okada et al. ............... 235/380 |
| 5,991,846 A * | 11/1999 | Ooki ........................... 710/241 |
| 6,266,693 B1 * | 7/2001 | Onaga ......................... 709/219 |
| 6,348,971 B2 * | 2/2002 | Owa et al. .................. 358/1.15 |
| 6,452,692 B1 * | 9/2002 | Yacoub ....................... 358/1.15 |
| 6,552,813 B2 * | 4/2003 | Yacoub ....................... 358/1.1 |
| 6,567,177 B2 * | 5/2003 | Matsuyama ................ 358/1.14 |
| 6,606,162 B1 * | 8/2003 | Simpson ...................... 358/1.15 |
| 6,611,880 B1 * | 8/2003 | Simpson et al. .............. 710/18 |
| 6,700,678 B1 * | 3/2004 | Luman ....................... 358/1.15 |
| 6,709,176 B2 * | 3/2004 | Gotoh et al. .................. 400/61 |
| 6,788,429 B1 * | 9/2004 | Clough et al. ............. 358/1.15 |

FOREIGN PATENT DOCUMENTS

| | | |
|---|---|---|
| JP | 05-108283 | 4/1993 |
| JP | 07-200215 | 8/1995 |
| JP | 10-320342 | 12/1998 |

* cited by examiner

*Primary Examiner*—John B. Walsh
(74) *Attorney, Agent, or Firm*—Morrison & Foerster LLP

(57) ABSTRACT

A group-differentiated route information generator extracts an accessible route according to the group affiliation of a user, and generates a group-differentiated route information table. An output destination automatic selector selects a route of shortest length based on the content of a user information table and the group-differentiated route information table.

11 Claims, 10 Drawing Sheets

| USER NAME | USER NUMBER | GROUP NUMBER | OTHER ATTRIBUTE INFO. |
|---|---|---|---|
| TARO | 1 | 10 | |
| JIRO | 2 | 20 | |
| ⋮ | ⋮ | ⋮ | |

FIG.4

| GROUP NAME | GROUP NUMBER | CONTROLLED AREA PASSAGE PERMISSION INFO. | OTHER ATTRIBUTE INFO. |
|---|---|---|---|
| GROUP A | 10 | PERMIT | |
| GROUP B | 20 | PROHIBIT | |
| ⋮ | ⋮ | ⋮ | |

FIG.5

| | 41 | 42 | 43 | 44 |
|---|---|---|---|---|
| | DEVICE NAME | DEVICE NUMBER | USABLE GROUP INFO. | OTHER ATTRIBUTE INFO. |
| 40 | COMPUTER | 200 | 10,20 | |
| | PRINTER 1 | 400 | 10,20 | |
| | PRINTER 2 | 500 | 10,20 | |
| | ⋮ | ⋮ | ⋮ | |

FIG.6

| | 51 | 52 | 53 | 54 | 55 | 56 |
|---|---|---|---|---|---|---|
| | ROUTE NUMBER | ORIGIN DEVICE NUMBER | END DEVICE NUMBER | LENGTH INFO. | CONTROLLED AREA PASS INFO. | OTHER ATTRIBUTE INFO. |
| 50 | 1101 | 200 | 400 | 4 | NO | |
| | 1201 | 200 | 500 | 3 | YES | |
| | 1202 | 200 | 500 | 10 | NO | |
| | ⋮ | ⋮ | ⋮ | ⋮ | ⋮ | |

FIG.7

| GROUP NAME (31) | GROUP NUMBER (32) | WEIGHT INFO. (33a) ||  OTHER ATTRIBUTE INFO. (34) |
|---|---|---|---|---|
| | | CONTROLLED AREA | STAIR | |
| GROUP A | 10 | 0 | 5 | |
| GROUP B | 20 | 100 | 5 | |
| ⋮ | ⋮ | ⋮ | ⋮ | |

FIG.11

| ROUTE NUMBER (51) | ORIGIN DEVICE NUMBER (52) | END DEVICE NUMBER (53) | LENGTH INFO. (54) | PASSAGE INFO. (55a) || OTHER ATTRIBUTE INFO. (56) |
|---|---|---|---|---|---|---|
| | | | | CONTROLLED AREA | STAIR | |
| 1101 | 200 | 400 | 4 | NO | NO | |
| 1201 | 200 | 500 | 3 | YES | YES | |
| 1202 | 200 | 500 | 10 | NO | NO | |
| ⋮ | ⋮ | ⋮ | ⋮ | ⋮ | ⋮ | |

FIG.12

INFORMATION DEVICE MANAGER, INFORMATION DEVICE MANAGEMENT METHOD, AND COMPUTER-READABLE RECORDING MEDIUM FOR RECORDING INFORMATION DEVICE MANAGEMENT PROGRAM

FIELD OF THE INVENTION

The present invention relates to an information device manager, information device management method, and computer-readable recording medium for recording information device management program.

BACKGROUND OF THE INVENTION

In recent years it has become common for information devices such as printer, copiers, computers and the like to be connected to a network. A user with a computer, for example, freely accesses each information device such as another computer, printer or the like connected to the network, and can mutually send and receive data.

In such an environment, managing a few information devices is comparatively simple. However, when a large number of information devices are connected to the network, not only does it becomes troublesome to manage scattered individual information devices one by one, but there is concern that work efficiency also may be reduced.

For example, when a user prints computer-generated document data using a printer and management of the information device has not been adequately established, there is concern the document may not be output from a printer near the user. That is, troublesome situations, such as being forced to go somewhat far to retrieve a document, may arise when a document is output from a printer at a physically distant location, or a location requiring a detour because desks or a wall lie between.

Methods for selecting an output destination by map information are known as means for eliminating these problems. For example, Japanese Laid-Open Patent No. H10-320342 discloses a method for specifying an input/output device using a graphic user interface (GUI) to assist the user selection operation by displaying input/output device on a network as icons in a graphical layout. This publication discloses a method which displays only input/output devices registered to individual users by specifying a user name in recording input/output devices commonly used by a specific user. Accordingly, a user can self-select a nearby input/output device from among input/output devices displayed in a graphical layout while considering wall and desk dispositions.

If the method of this disclosure is used as an output destination selection method, however, the output destination is selected only in terms of the physical layout. Accordingly, in practice when a user is from outside the company, there is concern that the user may select a printer that is located in a section which is off limits to the group to which the user belongs. Alternatively, the selected printer may be located in a section that is inaccessible because an off-limit section is interposed between, and as a result the printer is inaccessible without a long detour.

In the priority selection method of this disclosure, the user location may be fixed in the graphical layout, and the input/output device registered to an individual user may also be fixed. Accordingly, when, for example, a user transmits a print job to a printer connected to the network from a different computer than one normally used by the user, only the input/output device registered beforehand is the target of selection even when the user name is specified. Thus, inconveniences arise when the selection target is not among the printers near the actual current user location even when the user name is specified.

Furthermore, in the priority selection method of this disclosure, input/output devices are displayed in the graphic layout arrangement and user selection is demanded. Accordingly, there is concern that selection operation error may occur because the labor of searching for the nearest input/output device while viewing the graphic layout is still necessary.

These and other drawbacks and deficiencies exist in conventional systems and methods.

SUMMARY OF THE INVENTION

The present invention eliminates these disadvantages by automatically selecting one information device, and another nearest information device best matching the actual situation from among a plurality of other information devices connected to the network.

Aspects of the present invention are described below.

According to one embodiment, the present invention provides an information manager for managing a plurality of information devices connected by a network. The information manager includes a user information memory for storing user information such as group affiliation, a route memory for storing a plurality of routes for user travel among one information device and a plurality of other information devices, an accessibility difficulty memory for storing pass-through difficulty representing the degree of difficulty for a user to pass through the set route in accordance with user information, and a selector for selecting a route to another information device from the length of the route and the degree of accessibility difficulty in accordance with user information.

According to one aspect of this embodiment, the degree of accessibility difficulty is information representing whether or not a user is permitted or prohibited to pass through a route. The route selector selects the shortest route to another information device from the length of the route and the accessibility information in accordance with the user information.

According to another aspect of this embodiment, the degree of accessibility difficulty is information representing the degree of load on the user when the user passes through a route.

According to another aspect of this embodiment, the present invention provides a group-differentiated route information generator for generating route information for individual groups obtained by extracting only routes permitted for the group relative to each group to which a user is affiliated.

According to another aspect of this embodiment, the present invention provides a display device for displaying a plurality of other information devices based on a route selected by the route selector, and a specifying device for specifying to a user one among a plurality of other information devices.

According to another aspect of this embodiment, one information device is a device for transmitting a print job and another information device is a printer for printing received print jobs.

According to another embodiment, the present invention provides an information device management method for managing a plurality of information devices connected by a network, wherein a route to another information device is selected from the degree of accessibility difficulty representing the length of the route and the degree of difficulty for a user passing through the route in accordance with the set user information associated with the route in accordance with user information including group affiliations from among a plurality of routes for a user to pass through from one information device to a plurality of other information devices.

According to another embodiment, the present invention provides a computer-readable recording medium for recording information device management programs for managing a plurality of information devices connected by a network, wherein the computer-readable recording medium records information device management program for executing by computer a process for selecting a route to another information device from the degree of accessibility difficulty representing the length of the route and the degree of difficulty for a user passing through the route in accordance with user information including group affiliations from among a plurality of routes for a user to pass through from one information device to a plurality of other information devices.

The above and other aspects, features, and advantages of the present invention will become readily apparent from the following detailed description that is to be read in conjunction with the accompanying drawings.

BRIEF DESCRIPTION OF THE DRAWINGS

FIG. 4 shows a user information table;

FIG. 5 shows a group information table;

FIG. 6 shows a device information table;

FIG. 7 shows a route information table;

FIG. 11 shows a group information table in a second embodiment of the present invention;

FIG. 12 shows a route information table in the second embodiment; and

DETAILED DESCRIPTION OF THE PREFERRED EMBODIMENTS

The embodiments of the invention are described hereinafter with reference to the accompanying drawings.

Figure 1:
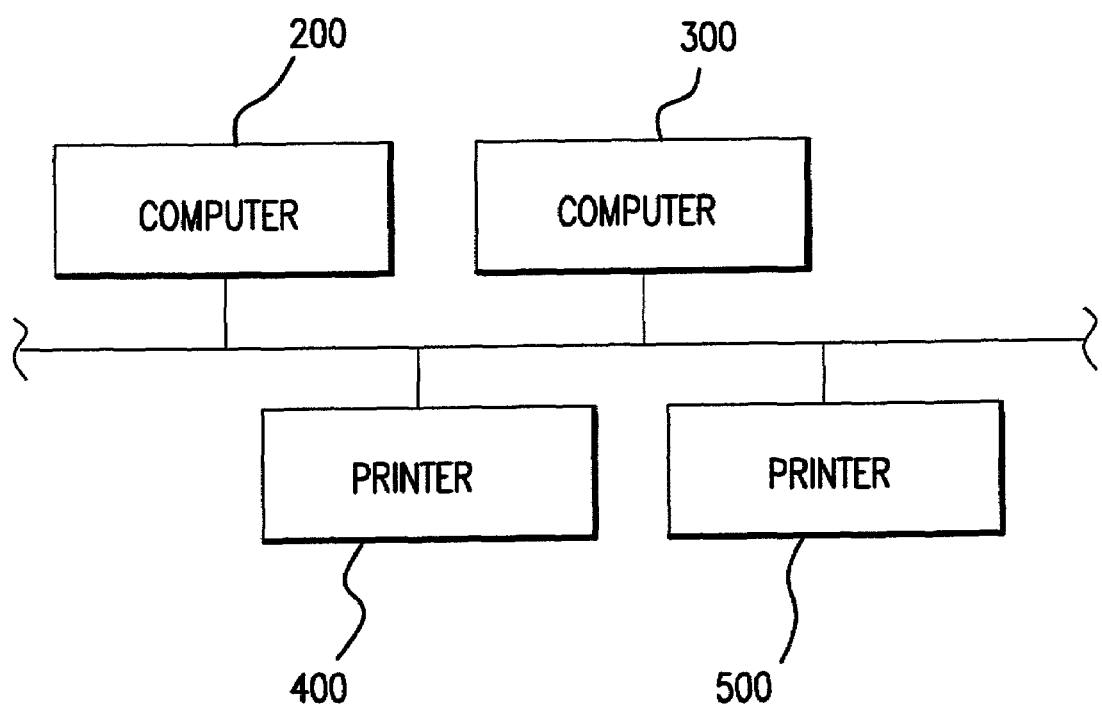
FIG. 1 shows the general structure of an information device system including the information device manager of a first embodiment of the present invention.

FIG. 1 shows the general structure of an information device system including an information device manager of a first embodiment of the present invention.

As shown in FIG. 1, The information device system comprises a plurality of information devices connected on a network 100. These information devices comprise computers 200 and 300 and printers 400 and 500, which are capable of mutually sending and receiving data over the network.

Figure 2:
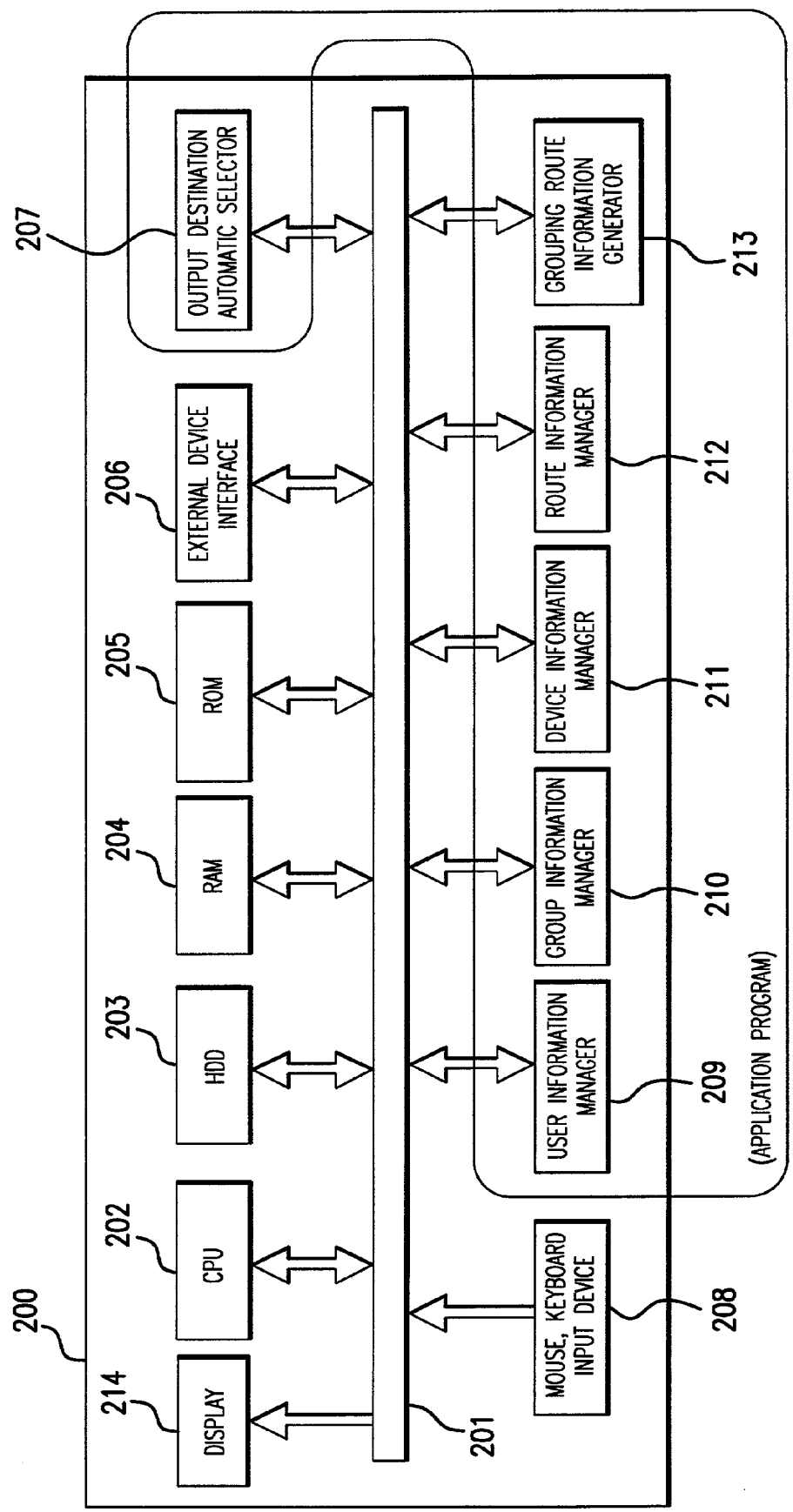
FIG. 2 is a block diagram showing the internal structure of a computer.

FIG. 2 is a block diagram showing the internal structure of a computer. Although the application programs (207 and 209–213) are shown separate from HDD 203 in FIG. 2, they can alternatively be either hardware or software and reside on HDD 203 or elsewhere. See FIG. 13.

Figure 13:
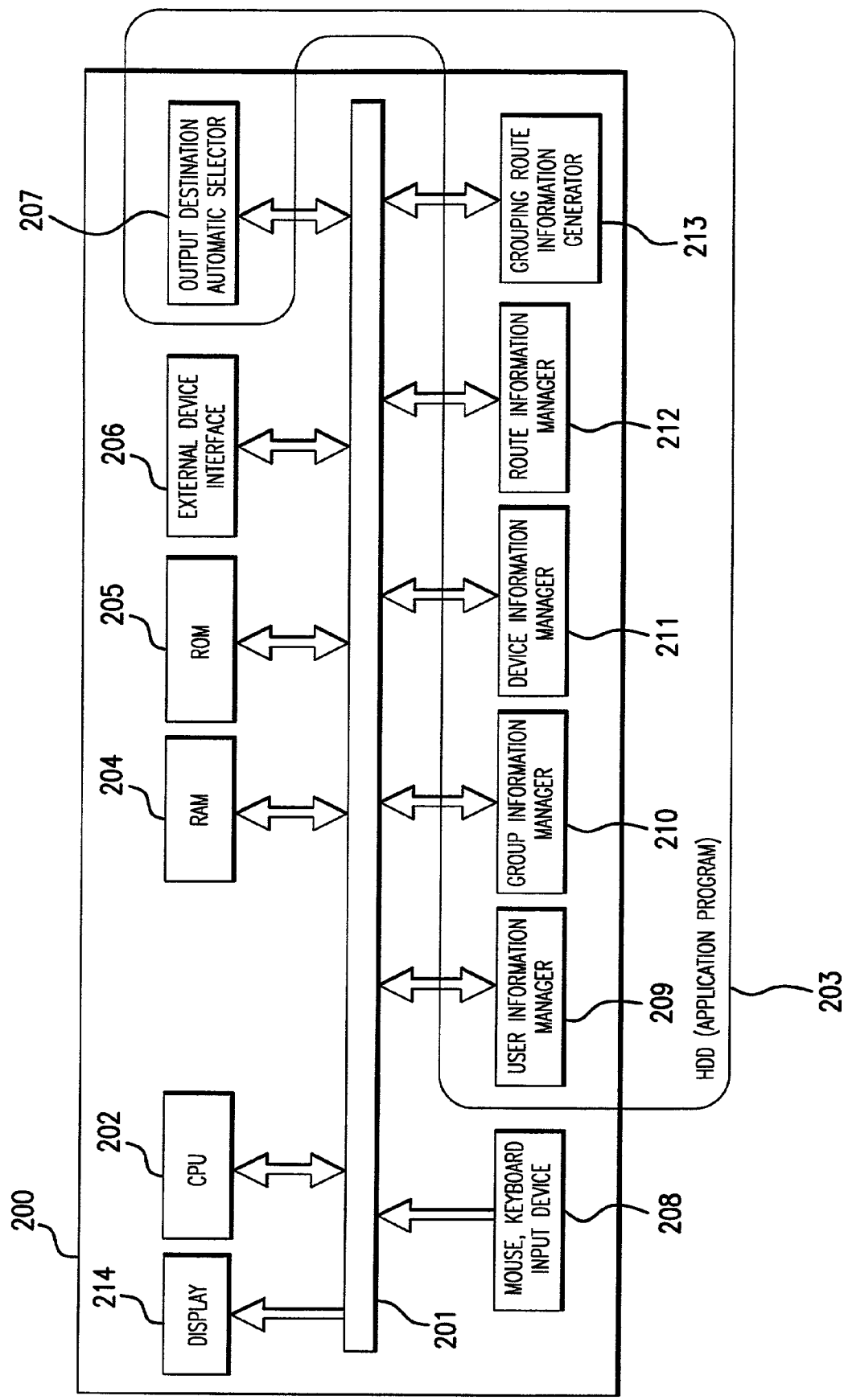
FIG. 13 is a block diagram showing the internal structure of a computer.

In the present embodiment, computers 200 and 300 function as information managers and have common structures. An example of the internal structure of the computer 200 is shown in FIGS. 2 and 13.

The computer 200 comprises a CPU 202 hard disk storage device (HDD) 203, RAM 204, ROM 205, external device interface 206, input device 208, and display 214 connected via a bus 201.

The bus 201 transmits information internally in the computer 200. The CPU 202 controls the entirety of the computer 200.

The hard disk storage device 203 stores user information, user-affiliated group (hereinafter referred to as "user group") information, information device information, route information between information devices, and various data representing information of user group-differentiated routes stored as tables. The hard disk storage device 203 further stores installations of operating system programs and application programs. The hard disk storage device 203 is not limited insofar as it is a non-volatile memory device. For example, hard disk storage device 203 may be a semiconductor memory such as non-volatile RAM, rewritable ROM and the like.

Hard disk storage device 203 stores various types of data and application programs, which function as a output destination automatic selector 207, user information manager 209, group information manager 210, device information manager 211, route information manager 212, and group route information generator 213, details of which are described later.

The RAM 204 temporarily stores data and programs, and ROM 205 stores control programs.

The external device interface 206 is an interface for communicating with peripheral devices included in the network.

The input device 208 is used for information input by the user, e.g., a keyboard, mouse, tablet or the like. The display 214 is one output device of the computer 200. Although the display 214 is described as part of the structure of the computer 200, it may be provided separately from the computer 200. It may be provided as a touch panel that an input device and a display are combined into one device. In the computer 200, a graphical user interface (GUI) is used as a method of operating the computer via graphical elements such as icons and windows displayed on a screen using a pointing device such as a mouse or the like.

The output destination automatic selector 207 automatically selects a printer for output destination for the most recent data from the computer 200 used by the user.

The user information manager 209, group information manager 210, device information manager 211, and route information manager 212 respectively manage user information tables representing user information, group information tables representing user group information, device information tables representing information device information, and route information tables representing information on user routes between information devices which are stored in non-volatile memory device 203.

The group-differentiated route information generator 213 generates group-differentiated route information tables by extracting only routes permitted for pass-through from the various user tables.

Figure 3:
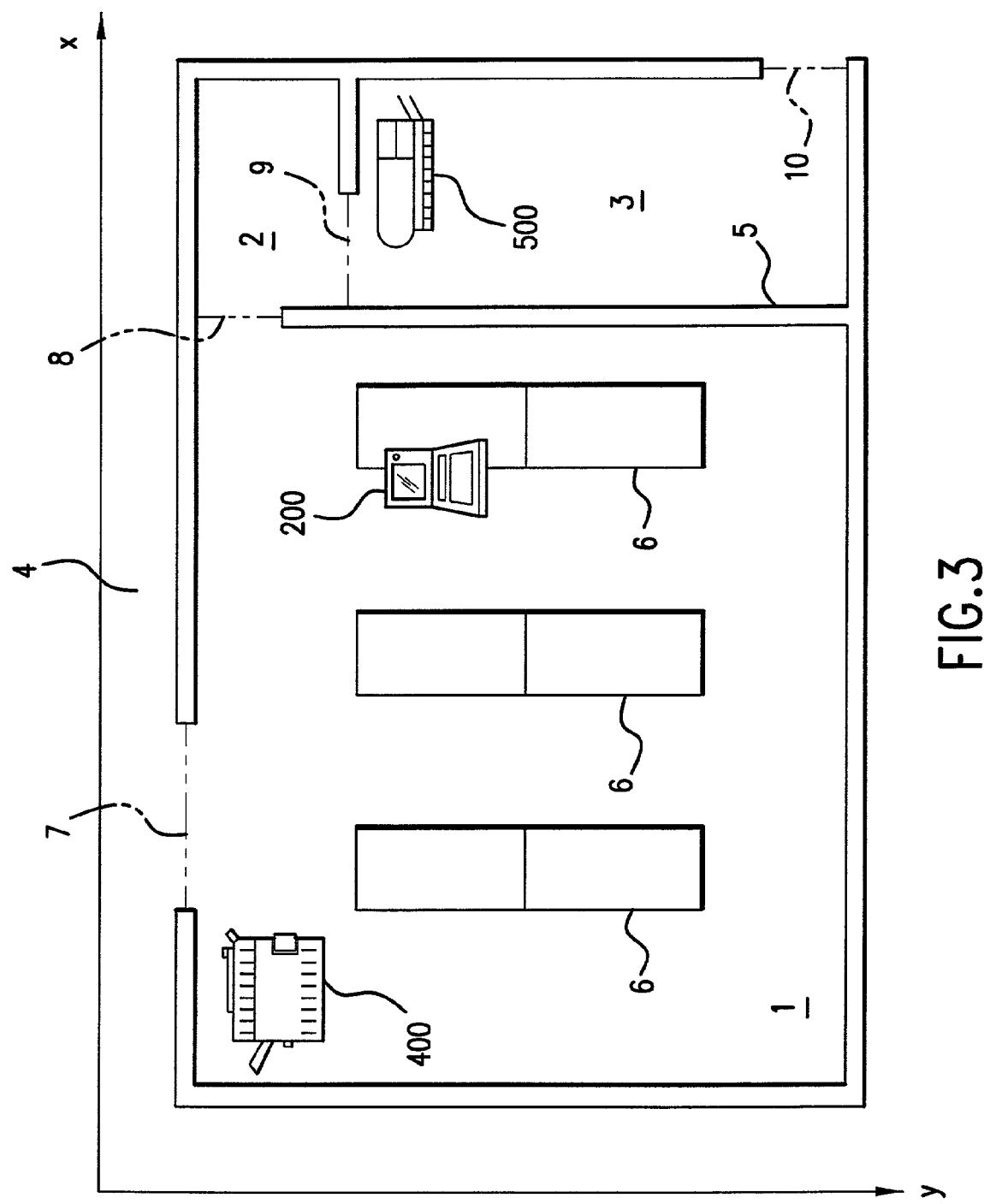
FIG. 3 is a layout diagram showing the disposition of each information device.

The methods for generating the various types of tables in FIGS. 4–7 and the layout diagram showing the disposition of each information device in FIG. 3 are described below.

The layout diagram and various types of tables are generated using specific application software executed by the CPU 202. These applications are started only when user information including the password of a specific manager is input.

First, map data are generated of the floor plan, for example, of an office by the input device 208. The method of generating the floor plan map data is not specifically limited, and the map data may be input through the peripheral device interface 206.

The floor plan map data has map elements of, for example, a room 1, controlled section 2, laboratory 3, hallway 4, wall 5, desk 6, and doors 7~10. A user inputs attribute information which indicates that the wall 5 and desk 6 are obstacles a user cannot pass through. On the other hand, the user inputs attribute information which indicates that the controlled section is a prohibited area through which passage is not permitted according to user information, which includes an attribute table.

Then, layout information of the information devices such as computers and printers is input. For example, while confirming the actual layout of information devices, icons representing the information devices are displayed at positions corresponding to the map data. In FIG. 3, only a computer 200, and printers 300, 400 and 500 shown in FIG. 1 are displayed to facilitate the description. The installation position (x,y) of the actual information devices may be confirmed, for example, by a camera or the like not shown in the drawing, map data may be sent to a computer through the network 100, and icons of each information device in the map data automatically displayed based on input electrical ground position information.

In this way, a layout diagram showing the dispositions of each information device in the map data can be generated. The generated layout diagram is stored in hard disk storage device 203.

The user information table shown in FIG. 4 and the group information table shown in FIG. 5 are generated by an input operation by management personnel in which the table generation function is selected from a menu displayed on the display device by executing application software.

The user information table 20 has a user name 21 in a text line representing the user name, user number 22 identifying the individual user, group number 23 of the user affiliation group, and other attribute information. The user number 22 may be omitted.

The group information table 30 has a group name 31 in a text line representing the names of each user group, group number 32 identifying individual user groups, controlled section passage permission information 33 representing the accessibility of controlled sections corresponding to a user group, and other attribute information 34. The group number 23 of the user information table 20 corresponds to the group number 32 of the group information table 30. In the group names 31 shown in FIG. 5, for example, group A represents regular employees and group B represents visiting employees. Group A and group B also may be assembled as employees and no employees, special unit employees and general employees and the like. The group names may also include three or more group names.

The device information table 40 shown in FIG. 6 and the route information table 50 shown in FIG. 7 are generated by executing application software. Part of the tables 40 and 50 are automatically generated with reference to the layout diagram generated beforehand, and the remaining part is generated via input operation by a management personnel. The generated table is stored in the hard disk storage device 203.

The device information table 40 comprises a device name 41 in a text line representing the name of the information device, device number 42 for identifying the information device, usable group information 43 listing the group number of user groups permitted to use this information device, and other attribute information 44. The device name 41 is automatically generated with reference to the layout diagram. The device name 41 also may be revised by manual input.

The route information table 50 comprises individually recognizable route number 51 representing routes between information devices in the layout diagram, origin device number 52 representing the device number of the information device at the starting point of the route, end device number 53 representing the device number of the information device at the endpoint of the route, length information 54 representing the length of the route, controlled section pass-through information 55 representing whether or not the route passes through a controlled section 2, and other attribute information 56. Items other than the other attribute information 56 are obtained from the route automatically generated with reference to the layout diagram as described below. Each item may be generated via input operation by management personnel.

Figure 8:
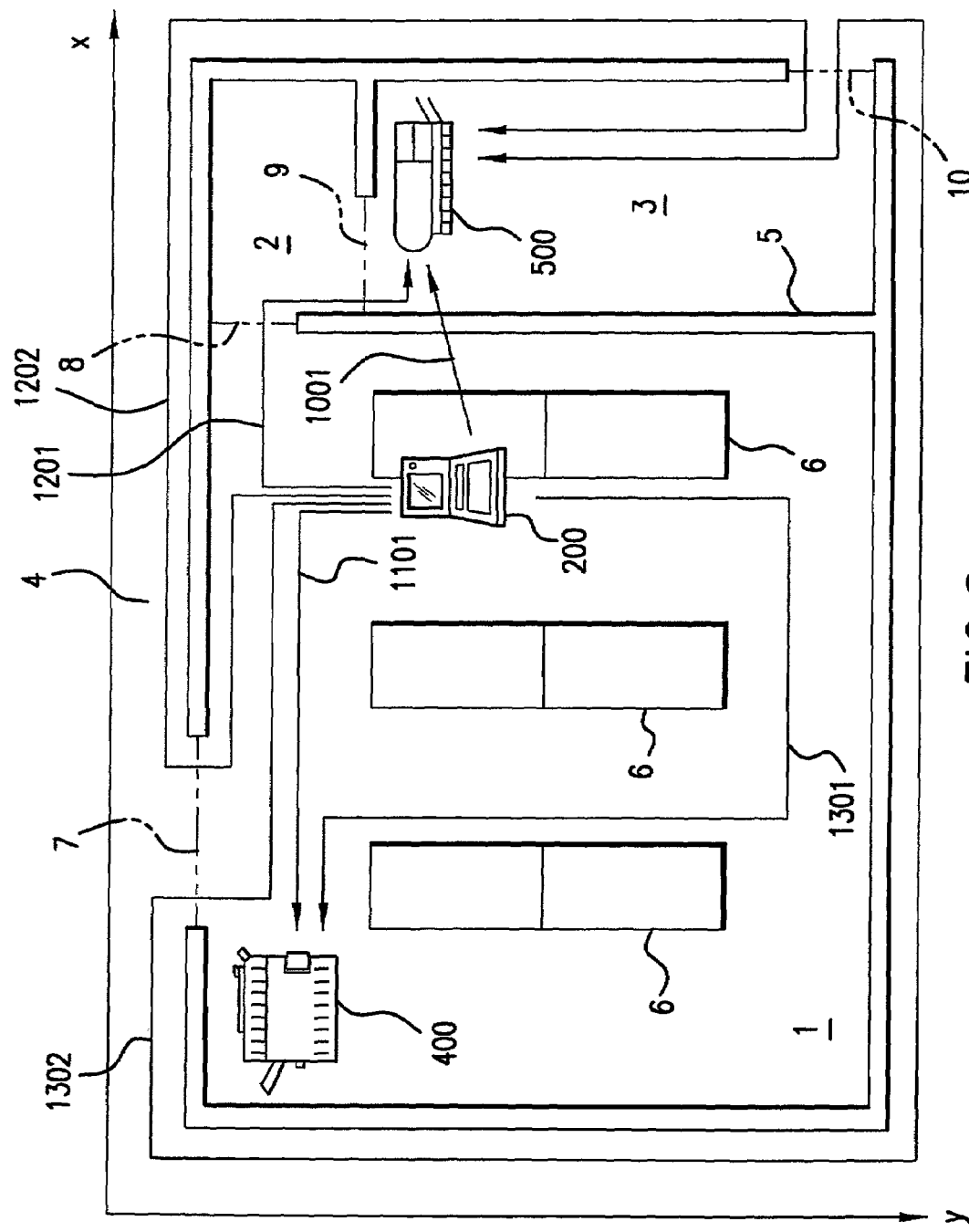
FIG. 8 illustrates the route generation method.

FIG. 8 illustrates a route generated by application software.

A route between information devices is automatically generated to circumvent wall 5 and desk 6 having attribute information representing obstacles with reference to the generated layout diagram. Accordingly, a route 1001 passing through wall 5 is not included in the route information table 50.

A route 1101 is the shortest route from the computer 200 to the printer 400. The length of the route 1101 is calculated as 4, for example, from the layout diagram. The fact that route 1101 does not pass through the controlled section 2 is detected.

A route 1201 is the shortest route from the computer 200 to the printer 500. The length of the route 1201 is calculated as 3, for example, from the layout diagram. The fact that route 1201 passes through the controlled section 2 is detected.

The routes from the computer 200 to the printers 400 and 500 include other routes 1301, 1302 and the like, these routes are not considered in the interest of simplifying the description. Routes using another information device such as the computer 300 (FIG. 1) as the origin are also generated in the same way.

Origin device number 52, end device number 53, length information 54, and controlled section pass-through information 55 of the route information table 50 are obtained based on the generated route.

Figure 9:
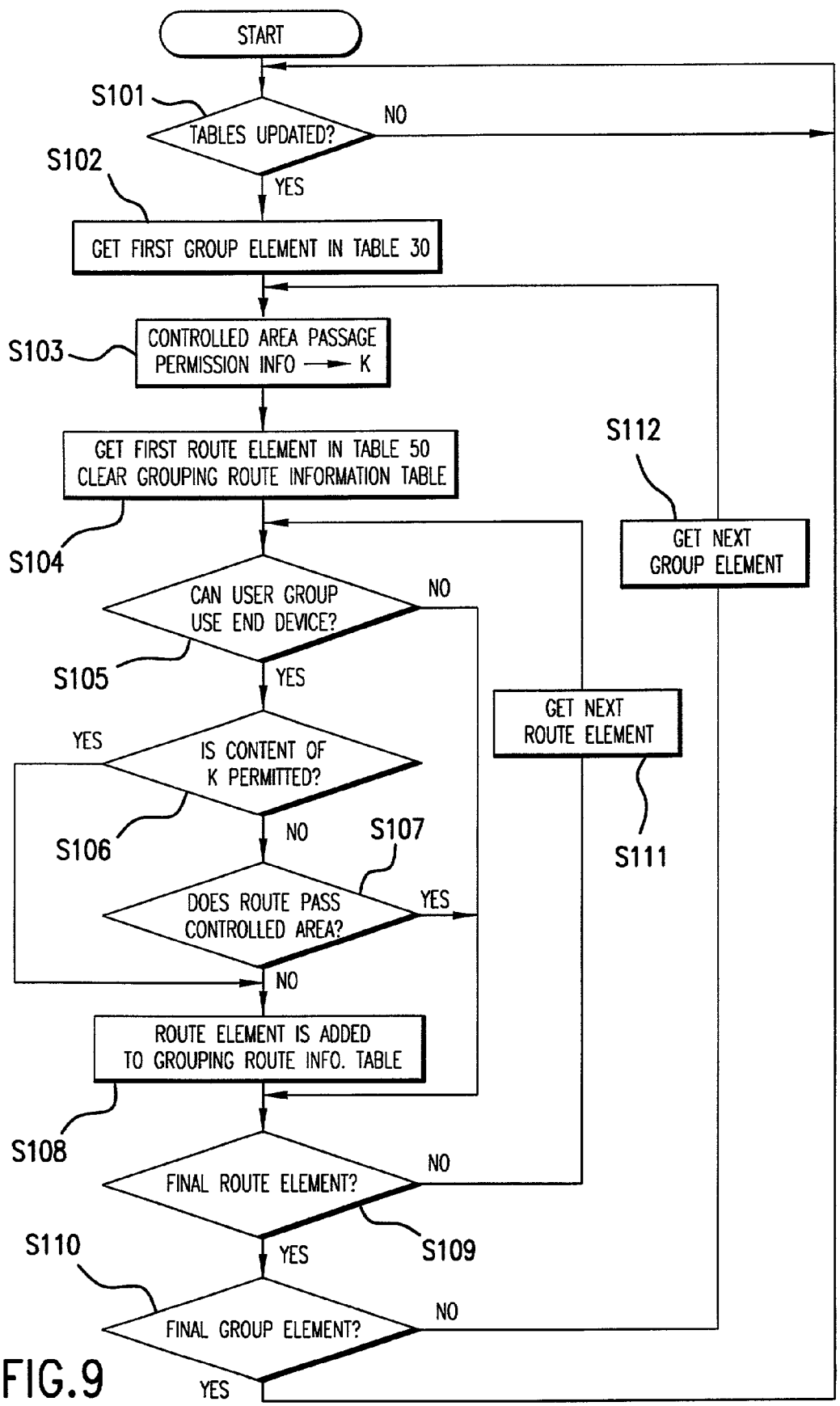
FIG. 9 is a flow chart of the operation of the group-differentiated route information generator.

The operation of the group-differentiated route information generator 213 is described below with reference to the flow chart of FIG. 9.

First, in step S101, a determination is made as to whether or not there has been an update of the content of any of the group information table 30, device information table 40, or route information table 50. An update of the content of the table is detected by the group information manager 210, device information manager 211, and route information manager 212. When the content of a table has been updated (S101: YES), the process of step S102 is executed, whereas when the content of a table has not been updated (S101: NO), the determination of step S101 is repeated.

In step S102, the first group element (record) in the group information table 30 is acquired and stored in memory. In step S103, the controlled section accessibility information of the group element is stored in area K of memory.

In step S104, the first route element in the route information table 50 is acquired. When a group-differentiated route information table already exists for the user group, the content of the group-differentiated route information table is cleared.

In step S105, a determination is made as to whether or not the user group is permitted to use the device at the end of the route with reference to the device information table 40. When the end device is usable (step S105: YES), the process of step S106 is executed, whereas when the end device is not usable (S105: NO), the process of step S109 is executed.

In step S106, a determination is made as to whether or not controlled section accessibility information stored in memory area K permits pass-through. When the content of area K is "access permitted" (S106: YES), the process of step S108 is executed, whereas when the content of area K is "access prohibited" (step S106: NO), the process of step S107 is executed.

In step S107, a determination is made as to whether or not controlled section accessibility information is present in the acquired route element. When the route passes through a controlled section (S107: YES), the process of step S109 is executed, whereas when the route does not pass through a controlled section (S107: NO), the process of step S108 is executed.

In step S108, the route element is added to the group-differentiated route information table.

In step S109, a determination is made as to whether or not the route element is the final route element in the route information table 50. If the route element is the final route element (S109: YES), the process of step S110 is executed, whereas when the route element is not the final route element (S109: NO), the routine advances to step S111.

In step S110, a determination is made as to whether or not the group element is the final group element in the group information table 30. If the group element is the final group element (S110: YES), the routine returns to step S101, whereas when the group element is not the final group element (S110: NO), the routine advances to step S112.

In step S111, the next route element in the route information table 50 is acquired, and the routine returns to step S105.

In step S112, the next group element in the group information table 50 is acquired, and the routine returns to step S103.

Then, the group-differentiated route information generator 213 extracts a route to a device which permits pass-through for a specific user group based on the content of the group information table 30, device information table 40, and route information table 50, and generates a group-differentiated route information table.

Accordingly, a group-differentiated route information table can be generated by extracting only routes effective for each user group, and automatic selection of output destination can be implemented with extreme ease as described layer.

It is desirable from the perspective of work efficiency that the group-differentiated route information table is generated when content of any of the tables 30, 40, 50 are updated. However, the group-differentiated route information table may be generated before operation of the output destination automatic selector 207 when a print job is sent.

Figure 10:
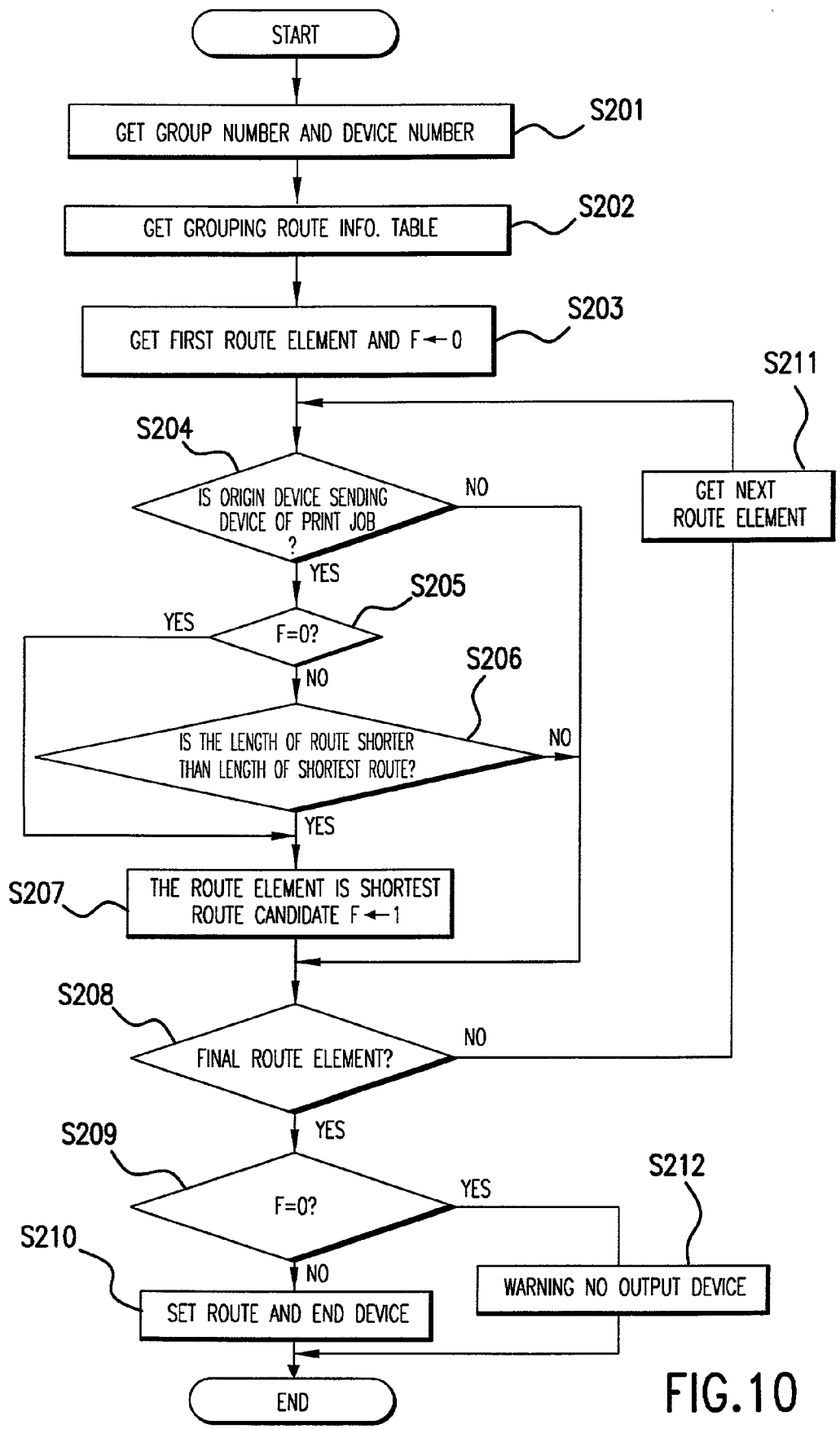
FIG. 10 is a flow chart of the operation of the output destination automatic selector.

The operation of the output destination automatic selector 207 is described below with reference to the flow chart of FIG. 10.

The output destination automatic selector 207 is started when, for example, when a job is sent specifying "output to nearest printer" in the print dialog box displayed on the display.

First, in step S201, the group number of the assigned group is acquired in accordance with the user information table 20 from the user name of the user sending the print job. The user name is input beforehand when the computer is logged in. The user name also may be input via the print dialog box. The computer device number used when a user sends a print job also may be acquired.

In step S202, the content of the group-differentiated route information table is acquired for the user group to which a user is assigned from among a plurality of group-differentiated route information tables generated by the group-differentiated route information generator 213.

In step S203, the first route element in the group-differentiated route information table is acquired. The flag F, representing whether or not the shortest route candidate has been acquired, is set at F=0.

In step S204, a determination is made as to whether or not the origin device number in the route element is identical to the device number of the computer sending the print job. That is, only routes wherein the origin is the sending device of the print job are sorted. When the origin of the route is the print job sending device (S204: YES), the process of step S205 is executed, whereas when the origin is not the print job sending device (S204: NO), the process of step S208 is executed.

In step S205, a check is made to determine whether or not the flag F=0. When F=0, it indicates the shortest route candidate has not yet been acquired. When F=0 (S205: YES), the process of step S207 is executed, whereas when F=0 (S205: NO), the process of step S206 is executed.

In step S206, a determination is made as to whether or not the length of the route is shorter than the length of shortest route candidates already obtained. When the length of the shortest route candidate is shorter (S206: YES), the process of step S207 is executed, whereas when the length of the shortest route candidate is longer (S206: NO), the process of step S208 is executed.

In step S207, the route element just acquired is used as the shortest route candidate. Then, the flag F is reset to F=1.

In step S208, a determination is made as to whether or not the route element is the final route element in the group-differentiated route information table. When the route element is the final route element (S208: YES), the routine advances to step S209, whereas when the route element is not the final route element (S208: NO), the routine advances to step S211.

In step S211, the next route element in the group-differentiated routine information table is acquired, and the routine returns to step S204.

In step S209, a check is made to determine whether or not the flag F=0. When F=0, the shortest route candidate has not been acquired. When F=0 (S209: YES), the routine advances to step S212, whereas when F≠0 (S209: NO), the routine advances to step S210.

In step S210, the shortest route candidate used last is selected as the shortest route, and the end device of the shortest route is set for output destination. When the set output destination printer is unusable due to obstacles or the like, the route having this printer as the end point is excluded, and the output destination automatic selection processes performed again.

In step S212, a warning is generated indicating that there is no usable output destination. This warning may be, for example, a generated sound or a warning message displayed on the display.

In this way the output destination automatic selector 207 only investigates the routes having the device from which the user sends the print job as a target based on the content of the user information table 20 and the group-differentiated route information table, and selects the route having the shortest length.

Accordingly, when, for example, a user affiliated with group B sends a print job from the computer 200 to the nearest printer, route 1101 is selected as the shortest route, and the end point device 400 of this shortest route is set as the output destination.

As shown in FIG. 8, if the controlled section 2 is ignored, the endpoint device printer 500 of the route 1201 is the nearest printer. However, the group B users cannot access the controlled section 2 and, therefore, the route 1201 is not included in the group-differentiated route information table of group B. For this reason the user must detour the route 1201 when going to retrieve the paper output from the printer 500. Accordingly, it is determined that the printer 400 which can be reached through the route 1101 is nearest the user.

On the other hand, when a print job is sent from the computer 200 by a user affiliated with group A to the nearest printer, the route 1201 is selected as the shortest route and the endpoint device 500 of this shortest route is set as the output destination.

As shown in FIG. 8, the printer 500 at the endpoint of this route 1201 is the printer nearest the user because the users of group A are allowed to pass through the controlled section 2.

According to this embodiment, information devices can be effectively managed by, for example, automatically selecting a printer nearest a user as the output destination, with consideration given to the group to which the user is affiliated, from among a plurality of printers 400 and 500 connected to a computer 200 via a network 100.

Furthermore, even when information devices such as printers and the like are added or removed, the automatic priority output function can be used with consideration given to user groups simply by minimum revision of the device information table 40 and route information table 50, thereby making maintenance easy.

FIG. 11 shows a group information table 30a of a second embodiment of the present invention, and FIG. 12 shows a route information table 50a of the same embodiment. The following description pertains mainly only to points differing from the first embodiment, and those aspects common to both embodiments are abbreviated.

The group information table 30a, which has a weighted information 33a, differs from the first embodiment which has controlled section accessibility information 33.

Weighted information 33a shows the degree of accessibility difficulty representing the difficulty of a user passing through a route set in accordance with user information; this degree is specified as a "weighting." That is, the degree of accessibility difficulty of a route is not limited to whether or not pass-through is permitted or prohibited in the second embodiment, but rather is quantified in detail for various sections. Degree of load (accessibility difficulty), for example, can be stairs, other obstacles, or length.

The numerical value of the weighted information 33a shown in FIG. 11 represents, for example, a value attached to the length of the actual route. Since group A has free access permitted to controlled section 2, group A is allocated a weighted value of 2, whereas group B is prohibited access to controlled section 2 and is allocated a weighted value of, for example, 100. The weighted value 100 can be set optionally insofar as the value is sufficiently larger than the value of the normal route length information such that this route will be selected. Both group A and group B are allocated a weighted value of, for example, 5 because users in group A and group B need to pass stairs.

The weighting may be set as a coefficient multiplying the length of the controlled section in the route. The area to which weighting is allocated is not limited top controlled section and level, e.g., an area requiring permission of management personnel to access, an area requiring a toll and the like. The weighting also may vary by time as in an area which is only accessible at specific times and the like.

The route information table 50a differs from the first embodiment in that it is provided with accessibility information 55a regarding level in addition to controlled section. That is, in the second embodiment, levels are appended to specific locations in the layout diagram shown in FIG. 3, and this layout diagram is used. Since access to a route of a certain level puts excess load on a user greater than an flat route, a weighting larger than a normal route is appended. Consider, for example, cases wherein the width of the path is narrow, or the route has a door as examples of route imparting excess load.

In the second embodiment, the route length is a revised logical length and is calculated for each route length based on the weighted information 33a for each user group in accordance with the user information. Then, for example, a group-differentiated route information table is generated with the addition of the logical length information calculated for each user group in the route information table 50a. In this aspect the group-differentiated route information table of the second embodiment differs from that of the first embodiment, which is generated by extracting only the accessible route from the route information table.

The logical length of the route 1101 in the group-differentiated route information table of group A is calculated as 4, the actual length of the route, because the route is inaccessible for controlled section and level. The logical length of the route 1201 is calculated as 8, since the actual length of the route is 3 and weighted value of 0 is appended for controlled section and weighted value of 5 is appended for level because the route has accessible controlled section and level. The logical length of the route 1202 is calculated as 15, since the actual length of the route is 10, and a weighted value of 5 is appended for level since the route is inaccessible for controlled section but accessible for level.

Similarly, in the group-differentiated route information table of group B, the logical length of the route 1101 is calculated as 4. The logical length of the route 1201 is calculated as 108, since the actual length is 3, to which is appended a weighted value of 100 for the controlled section and a weighted value of 5 for the level. The logical length of route 1202 is calculated as 15, since the actual route length is 10, to which is appended the weighted value 5 for level.

The operation of automatic selection of output destination is executed similar to the first embodiment using the logical length of the route in place of the actual length of the route. In the examples of FIGS. 11 and 12, since the logical length of the route 1101 is shortest for either group A and group B, the printer 400 at the endpoint of the route 1101 is selected as the output destination.

The second embodiment, in addition to obtaining an efficacy similar to the first embodiment, also can automatically select the output destination which better matches the actual conditions even, for example, in a complex and subtle floor environment.

The present invention is not limited only to the previously described embodiments, and may be variously modified within the scope of the claims.

For example, although the aforesaid embodiments have been described in terms of determining an output destination by selecting the shortest route via the output destination automatic selector 207, the invention is not limited to this arrangement, inasmuch as a plurality of output destinations may be extracted by the output destination automatic selector 207 selecting a number of short routes. In this case, for example, a user may specify one output destination from among a plurality of output destinations listed in a display or displayed as icons on the display.

The computers 200 and 300 which transmit print jobs in the aforesaid embodiments may be replaced by, for example, work stations, scanners and the like. Furthermore, the printers 400 and 500 which receive the print jobs and execute printing may be replaced by, for example, copiers, facsimile machines and the like.

Although the aforesaid embodiments have been described in terms of a computer which transmits a print job as the origin of a route, the present invention is not limited to this arrangement inasmuch as, for example, a device used by a person receiving printed matter also may be the origin of a route. In this case the device designated the origin of the route and the user name of the person receiving the printed matter must be input.

The aforesaid embodiments have been described in terms of selecting a desired route from among routes in which the device transmitting a job is the origin and the device receiving the print job is the endpoint. However, the present invention is not limited to this arrangement and the device receiving a job may be designated the origin and the device transmitting the job may be the endpoint. In this case, for example, the processing priority may be determined on the printer side when there are competing print requests from a plurality of users.

In the system of the aforesaid embodiments, job transmission and reception has no direct relationship, for example, the information device of a specific type nearest the computer of a user may be sought. In this case, the device designated the endpoint of the route, for example, may be an image input device such as a scanner. The above embodiments have been described in terms of computers 200 and 300 connected on a network 100 functioning as information device managers. However, the present invention is not limited to this arrangement inasmuch as a manager server connected on the network 100 may batch manage as an information device manager. Various types of tables such as the user information table may be stored on a file server connected on the network 100.

Furthermore, the network system is not limited to a wireline network and may be a wireless network such as a wireless LAN system and the like.

The structural essentials comprising the previously described information device manager and information device management method can be realized by special hardware circuits or programmed computer. Furthermore, when the present invention is realized by programmed computer, the program operating the computer may be provided on a computer-readable recording medium (e.g., floppy disk, CD-ROM or the like). In this case, a program recorded on a computer-readable recording medium is read by a recording medium reader, and generally transferred to and stored on a hard disk. This program, for example, may be provided as a single application, or may be incorporated in the software of the computer as one function of the computer.

According to the embodiments described above, a route from one information device to another information device nearest the user determined by matching the actual conditions is automatically selected from among a plurality of other information devices connected on a network considering the group affiliation of the user, thereby efficiently managing the information devices.

Furthermore, the automatic selection function can be used to select a route considering the group affiliation of a user with only minimum revision of route information even when information devices such as printers and the like are added or removed, thereby making maintenance easy.

Although certain presently preferred embodiments and examples of the present invention have been specifically described herein, it will be apparent to those skilled in the art to which the invention pertains that variations and modifications of the various embodiments and examples shown and described herein may be made with departing from the spirit and scope of the invention.

What is claimed is:

1. An information management system for managing a plurality of information devices connected by a network, the system comprising:
   a user information memory storing user information;
   a route memory storing a plurality of routes for user travel between a plurality of information devices;
   an accessibility difficulty memory storing a pass-through difficulty representing at least one obstacle to user passage associated with at least one of the plurality of routes for user travel in accordance with the user information; and
   a selector selecting a route between two of the plurality of information devices based on a length of the route and the pass-through difficulty in accordance with the user information.

2. An information management system as claimed in claim 1, wherein the pass-through difficulty comprises information representing whether or not a user is permitted or prohibited to pass through a route.

3. An information management system as claimed in claim 2, wherein the selector selects a shortest route to another information device based on the length of the route and the pass-through difficulty in accordance with the user information.

4. An information management system as claimed in claim 3, wherein the pass-through difficulty comprises information representing the degree of load on the user when the user passes through a route.

5. An information management system as claimed in claim 1, further comprising a group-differentiated route information generator generating route information for individual groups obtained by extracting only routes permitted for a group relative to each group to which the user is affiliated.

6. An information management system as claimed in claim 1, further comprising a display device displaying a plurality of other information devices based on a route selected by the selector and a specifier specifying to the user one among the plurality of other information devices.

7. An information management system as claimed in claim 1, wherein one of the plurality of information devices is a device for transmitting a print job and another of the plurality of information devices is a printer for printing received print jobs.

8. An information device management method for managing a plurality of information devices connected by a network, comprising:
   obtaining a degree of accessibility difficulty representing both a length of a route for user travel and at least one obstacle to user passage associated with the route, in accordance with user information associated with the route; and
   selecting an optimal route from a first information device to a second information device based on the degree of accessibility difficulty.

9. An information device management method as claimed in claim 8, wherein the user information includes group affiliations from among a plurality of routes for the user to pass through from the first information device to a plurality of other information devices.

10. A computer-readable medium having stored thereon a plurality of sequences of instructions, the plurality of sequences of instructions including sequences of instructions, which, when executed by a processor, cause the processor to perform the step of implementing a process for selecting a route for user travel from a first information device to a second information device based on a degree of accessibility difficulty based on user information and representing both a length of the route and at least one obstacle to user passage associated with the route, the degree of accessibility difficulty being based on user information.

11. A computer-readable medium as claimed in claim 10, wherein the user information includes group affiliations from among a plurality of routes for the user to pass through from the first information device to a plurality of other information devices.

* * * * *